(12) United States Patent
Batarseh (10) Patent No.: US 10,415,338 B2
(45) Date of Patent: Sep. 17, 2019

(54) DOWNHOLE HIGH POWER LASER SCANNER TOOL AND METHODS

(71) Applicant: Saudi Arabian Oil Company, Dhahran (SA)

(72) Inventor: Sameeh Issa Batarseh, Dhahran (SA)

(73) Assignee: Saudi Arabian Oil Company (SA)

( * ) Notice: Subject to any disclaimer, the term of this patent is extended or adjusted under 35 U.S.C. 154(b) by 221 days.

(21) Appl. No.: 15/661,104

(22) Filed: Jul. 27, 2017

(65) Prior Publication Data
US 2019/0032434 A1   Jan. 31, 2019

(51) Int. Cl.
*E21B 29/02*   (2006.01)
*E21B 7/15*   (2006.01)
(Continued)

(52) U.S. Cl.
CPC ............... *E21B 29/02* (2013.01); *E21B 7/15* (2013.01); *G01B 11/24* (2013.01); *G02B 6/262* (2013.01);
(Continued)

(58) Field of Classification Search
CPC ........ E21B 43/2401; E21B 43/24; E21B 7/14; E21B 7/15; E21B 29/02; B23K 26/16; B23K 26/382
See application file for complete search history.

(56) References Cited

U.S. PATENT DOCUMENTS

| 4,090,572 A | 5/1978 | Welch |
| 4,113,036 A * | 9/1978 | Stout ........................ E21B 7/15 166/248 |

(Continued)

FOREIGN PATENT DOCUMENTS

| CN | 104625437 A | 5/2015 |
| GB | 2420135 A | 5/2006 |
| WO | 2004009958 A1 | 1/2004 |

OTHER PUBLICATIONS

Anonymous"Laser Applications Laboratory—Laser Oil & Gas Well Drilling" Argonne National Laboratory, Nuclear Engineering Division, http://www.ne.anl.gov/facilities/lal/laser_drilling.html, printed Feb. 5, 2013, 2 pages.
Bakhtbidar et al."Application of Laser Technology for Oil and Gas Wells Perforation" SPE/IADC Middle East Drilling Technology Conference and Exhibition, SPE/IADC 148570, Muscat, Oman, Oct. 24-26, 2011, 12 pages.

(Continued)

*Primary Examiner* — Kenneth L Thompson
(74) *Attorney, Agent, or Firm* — Bracewell LLP; Constance C. Rhebergen (57) ABSTRACT

A method to control the shape of an opening in a formation including the steps of emitting a laser beam from a fiber optic cable into a direction unit, focusing the laser beam in the focusing lens to produce a focused laser, collimating the focused beam in the collimating lens to produce a directed beam, directing the directed beam onto a motorized master, where the compact scanner further comprises a motorized slave, wherein the motorized master comprises a master mirror and a master motor, wherein the motorized slave comprises a slave mirror and a slave motor, operating the motorized master and the motorized slave to produce a controlled beam, where the controlled beam moves in a movement pattern, introducing the controlled beam to a laser head, sublimating the formation to produce the opening, and vacuuming the dust and vapor with the vacuum nozzle.

15 Claims, 4 Drawing Sheets

(51) Int. Cl.

| | | |
|---|---|---|
| *B23K 26/16* | (2006.01) | |
| *B23K 26/382* | (2014.01) | |
| *G01B 11/24* | (2006.01) | |
| *G02B 6/26* | (2006.01) | |
| *G02B 6/32* | (2006.01) | |
| *G02B 19/00* | (2006.01) | |
| *G02B 26/10* | (2006.01) | |
| *G02B 27/09* | (2006.01) | |
| *G02B 27/30* | (2006.01) | |

(52) U.S. Cl.
CPC ............ *G02B 6/32* (2013.01); *G02B 19/0009* (2013.01); *G02B 19/0047* (2013.01); *G02B 26/105* (2013.01); *G02B 27/0955* (2013.01); *G02B 27/0994* (2013.01); *G02B 27/30* (2013.01)

(56) References Cited

U.S. PATENT DOCUMENTS

| | | | |
|---|---|---|---|
| 4,227,582 A | 10/1980 | Price | |
| 4,282,940 A | 8/1981 | Salisbury et al. | |
| 4,589,729 A * | 5/1986 | Bridges | B23K 26/06 385/125 |
| 6,870,128 B2 | 3/2005 | Kobayashi et al. | |
| 6,880,646 B2 | 4/2005 | Batarseh | |
| 6,888,097 B2 | 5/2005 | Batarseh | |
| 7,490,664 B2 | 2/2009 | Skinner et al. | |
| 9,217,291 B2 | 12/2015 | Batarseh | |
| 10,221,667 B2 * | 3/2019 | Montaron | E21B 43/26 |
| 10,221,687 B2 * | 3/2019 | Mladjan | E21C 37/18 |
| 2006/0102343 A1 * | 5/2006 | Skinner | E21B 7/15 166/250.1 |
| 2007/0138371 A1 | 6/2007 | Marshall | |
| 2007/0267220 A1 | 11/2007 | Magiawala et al. | |
| 2011/0132881 A1 | 6/2011 | Liu | |
| 2012/0074110 A1 | 3/2012 | Zediker et al. | |
| 2012/0118568 A1 | 5/2012 | Kleefisch et al. | |
| 2013/0008659 A1 | 1/2013 | Schultz et al. | |
| 2013/0228372 A1 | 9/2013 | Linyaev et al. | |
| 2014/0360778 A1 | 12/2014 | Batarseh | |
| 2015/0115145 A1 * | 4/2015 | Edwards | G01D 5/34 250/256 |
| 2016/0160618 A1 | 6/2016 | Batarseh | |
| 2016/0312587 A1 * | 10/2016 | Montaron | E21B 29/06 |

OTHER PUBLICATIONS

Batarseh et al."Deep hole penetration of rock for oil production using Ytterbium fiber laser" SPIE Proceedings, Conference vol. 5448, High-Power Laser Ablation V, 818, Taos, New Mexico, Sep. 20, 2004, 9 pages.

Batarseh et al."Innovation in Wellbore Perforation Using High-Power Laser" International Petroleum Technology Conference, IPTC 10981, Doha, Qatar, Nov. 21-23, 2005, 7 pages.

Batarseh et al."Well Perforation Using High-Power Lasers" SPE Annual Technical Conference and Exhibition, SPE 84418, Denver, Colorado, Oct. 5-8, 2003, 10 pages.

International Search Report and Written Opinion for related PCT application PCT/US2014/036553 dated Feb. 18, 2015.

The International Search Report and Written Opinion for related PCT application PCT/US2018/044025 dated Nov. 15, 2018.

* cited by examiner

DOWNHOLE HIGH POWER LASER SCANNER TOOL AND METHODS

TECHNICAL FIELD

Disclosed are apparatus and methods related to the use of well stimulation. Specifically, disclosed are apparatus and methods related to the use of lasers in downhole applications.

BACKGROUND

Well stimulation processes refer generally to those processes that increase fluid communication between the formation and wellbore.

Perforation processes create a path from the formation, through the layers surrounding the wellbore, and to the wellbore. The layers that surround the wellbore can include the casing, a liner, or cement sheath. Conventional perforation processes include the use of shaped charges, bullet perforating, and the use of high-pressure or abrasive jetting. Shaped charges, while effective, cannot be well controlled and can lead to compaction, deformation and sanding of the formation.

Cutting the casing for the purpose of creating a sidetrack can be done when a secondary wellbore can increase fluid communication from the formation to the surface. Conventional methods for cutting the casing uses milling technology which can take time and can lack accuracy.

Other methods can be used to create small holes in the liner to act as a mesh for catching sand and other small particulates that filter through. Downhole casing cutting for side tracking Well stimulation processes can also include steps taken to perforation of the formation. Other processes downhole can be used to increase fluid communication between the formation and wellbore.

SUMMARY

Disclosed are apparatus and methods related to the use of lasers downhole. Specifically, disclosed are apparatus and method related to laser control in downhole applications.

In a first aspect, a method to control the shape of an opening in a formation is provided. The method includes the steps of emitting a laser beam from a fiber optic cable into a direction unit, where the direction unit includes a focusing lens and a collimating lens, focusing the laser beam in the focusing lens to produce a focused laser, collimating the focused beam in the collimating lens to produce a directed beam, directing the directed beam onto a motorized master, wherein the motorized master is contained in a compact scanner, where the compact scanner further includes a motorized slave, where the motorized master includes a master mirror and a master motor, where the motorized slave includes a slave mirror and a slave motor, operating the motorized master and the motorized slave to produce a controlled beam, where the controlled beam moves in a movement pattern, introducing the controlled beam to a laser head, where the laser head includes an inlet lens, an outlet lens, an air knife, a purging nozzle, a vacuum nozzle, and a temperature sensor, passing the controlled beam through the inlet lens and the outlet lens, where the inlet lens and outlet lens protect the compact scanner from debris, sweeping the outlet lens with gas from the air knife, purging the path of the controlled beam with a purging fluid from the purging nozzle, sublimating the formation to produce the opening, where in the shape of the opening is dictated by the movement pattern of the controlled beam, and vacuuming the dust and vapor with the vacuum nozzle.

In certain aspects, the method further includes the steps of extending a laser tool into a wellbore extending through the formation, the downhole laser tool includes the direction unit, the compact scanner, and the laser head, operating a laser unit to produce the laser beam, and directing the laser beam through the fiber optic cable from the laser unit to the laser tool. In certain aspects, the movement pattern is determined based on a ratio of a rotation of motorized master to a rotation of the motorized slave. In certain aspects, the method further includes the step of programming the compact scanner to achieve the movement pattern prior to the step of extending the laser tool into the wellbore. In certain aspects, the method further includes the step of penetrating a casing and cement surrounding the wellbore prior to the step of sublimating the formation. In certain aspects, the shape of the opening is an oval. In certain aspects, a power of the laser beam is between 500 W and 2500 W.

In a second aspect, an apparatus to control the shape of a opening in a formation is provide. The apparatus includes a direction unit configured to manipulate a size of a laser beam to produce a directed beam, where the direction unit includes a focusing lens and a collimating lens, a compact scanner optically connected to the direction unit, the compact scanner configured to guide the directed beam to produce a controlled beam, where the compact scanner includes a motorized master and a motorized slave, where the controlled beam has a movement pattern, and a laser head optically connected to the compact scanner, the laser head configured to protect the compact scanner from debris, where the laser head includes an inlet lens, an outlet lens, an air knife, a purging nozzle, a vacuum nozzle, and a temperature sensor.

In certain aspects, the apparatus further includes a laser unit configured to generate the laser beam, and a fiber optic cable optically connected to the laser unit, the fiber optic cable configured to transmit the laser beam from the laser unit to the direction unit, where the laser unit is located near a wellbore extending into a formation, wherein the fiber optic extends through the wellbore, where the direction unit, the compact scanner and the laser unit are positioned in the wellbore. In certain aspects, the focusing lens is configured to focus the laser beam to produce a focused beam and the collimating lens is configured to collimate the focused beam to produce the directed beam. In certain aspects, the motorized master includes a master motor and a master mirror. In certain aspects, the motorized slave includes a slave motor and a slave mirror. In certain aspects, the movement pattern is determined by a ratio of a rotation of the motorized master to a rotation of the motorized slave. In certain aspects, the shape of the opening is dictated by the movement pattern of the controlled beam.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

Methods and apparatus directed to control of the shape of an opening in a formation are described herein. Methods and apparatus directed to control of the movement of a laser beam are described herein. The laser tool includes a direction unit, a compact scanner, and a laser head that produces a controlled beam which can form openings in the formation. The compact scanner includes a motorized master mirror and a motorized slave mirror which both rotate. The ratio of the rotation of the motorized master mirror to the rotation of the motorized slave mirror creates a movement pattern of the laser beam. Adjusting the ratio of the rotation changes the movement pattern. The shape of the opening in the formation is dictated by the movement pattern. The compact scanner can be programmed with one or more movement patterns in a single run. The movement patterns can be programmed at the surface or can be programmed while in situ.

Advantageously, the methods and apparatus described allow for controlled perforation of the formation. Advantageously, the methods and apparatus described allow for pre-determination of the shape and direction of the openings in the formation. By controlling the shape and direction of the openings in the formation, the openings can be aligned with the stress direction of the formation, which results in openings that are more robust and less prone to collapse.

Advantageously, the methods and apparatus described allow for the use of laser beams with power of less than 2000 W to cut perforations in the formation, including laser beams with power of between 500 W and 2000 W. As a laser beam is transmitted through the fiber optic cable, the laser beam loses power and at depths below 100 meters (m), the power loss can be high and can result in a laser beam with insufficient power to cut through the layers surrounding the wellbore.

As used herein, "shape" of "shape of the opening" refers to the outline of the opening in the x-y plane perpendicular to the laser tool. Shapes can include circles, ovals, trapezoids, and any shape that can be formed by the Lissajous curves. In at least one embodiment, the shape of the opening can be a circle, an oval, or a trapezoid. In at least one embodiment, shape can be formed by a Lissajous curve. In at least one embodiment, the shape of the opening is an oval. Advantageously, when the shape of the opening is an oval, where the longer sides are parallel to the stress, the shape can provide better resistance to collapse than other shapes.

Figure 1:
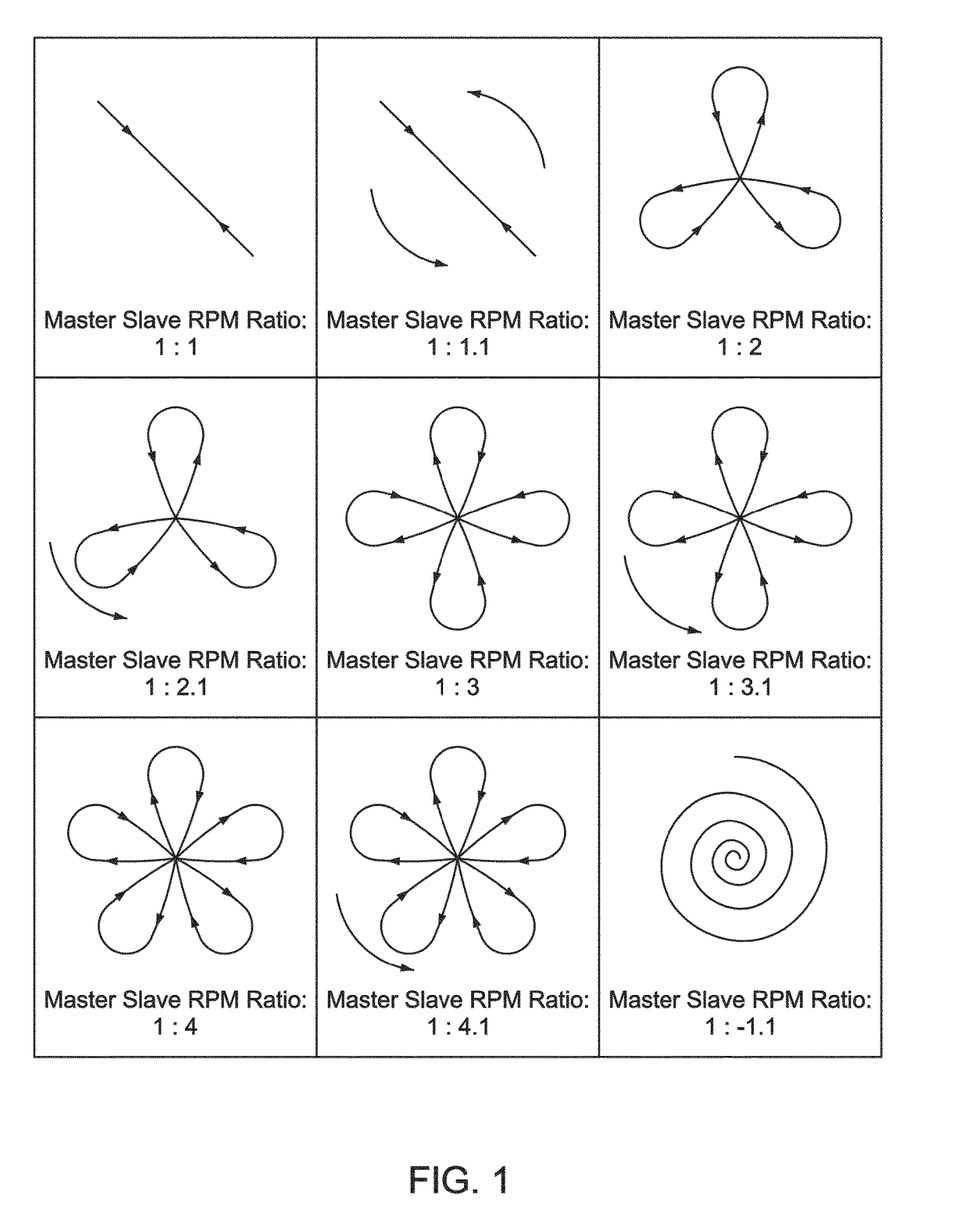
FIG. 1 provides a pictorial representation of examples of the movement patterns.

As used herein "movement pattern" refers to the pattern in which the perforation beam moves and is based on the Lissajous curves and specifically the ratio of "a" in equation 1 to "b" in equation 2. The ratio of the rotation of the motorized master to the rotation of the motorized slave influences the movement pattern. Examples of movement patterns with the associated ratios are shown in FIG. 1.

As used herein, "Lissajous curve" refers to a curve described by the parametric equations:

$$x = A*\sin(a*t+\delta) \qquad \text{equation 1}$$

$$y = B*\sin(b*t) \qquad \text{equation 2}$$

where A and B represent amplitudes in the x and y directions, a and b are constants, and δ is a phase angle.

As used herein, "debris" refers to dust, vapor, and particulate matter.

As used herein, "intensity" is a measure of power per unit area. Unit area for a laser beam is calculated based on the spot size. Intensity is measured in $W/cm^2$. The spot size can be controlled by the focal point of the lens and the lens type. The larger the surface area of the mirror, the larger the spot size.

As used herein, "opening" refers to perforations, holes, tunnels and notches in the materials of the wellbore and the surrounding rock formations. The openings can have dimensions along the two-dimensional plane and a penetration depth. As used herein, "perforations" refers to openings that extend from the wellbore through the casing and cementing and into the rock formation that can have a penetration depth of up to 48 inches into the formation. As used herein, "holes" refer to openings that extend from the wellbore through the casing and cementing. As used herein, "tunnels" refer to openings that extend from the wellbore through the casing and cementing and into the rock formation that can have a penetration depth of up to a 300 feet. As used herein, "notches" refers to scratches on the rock or small scratches in an opening.

As used herein, "penetration depth" refers to the distance the opening extends into the formation as measured from the wellbore into the formation at the farthest point the opening penetrates the wellbore.

Figure 2:
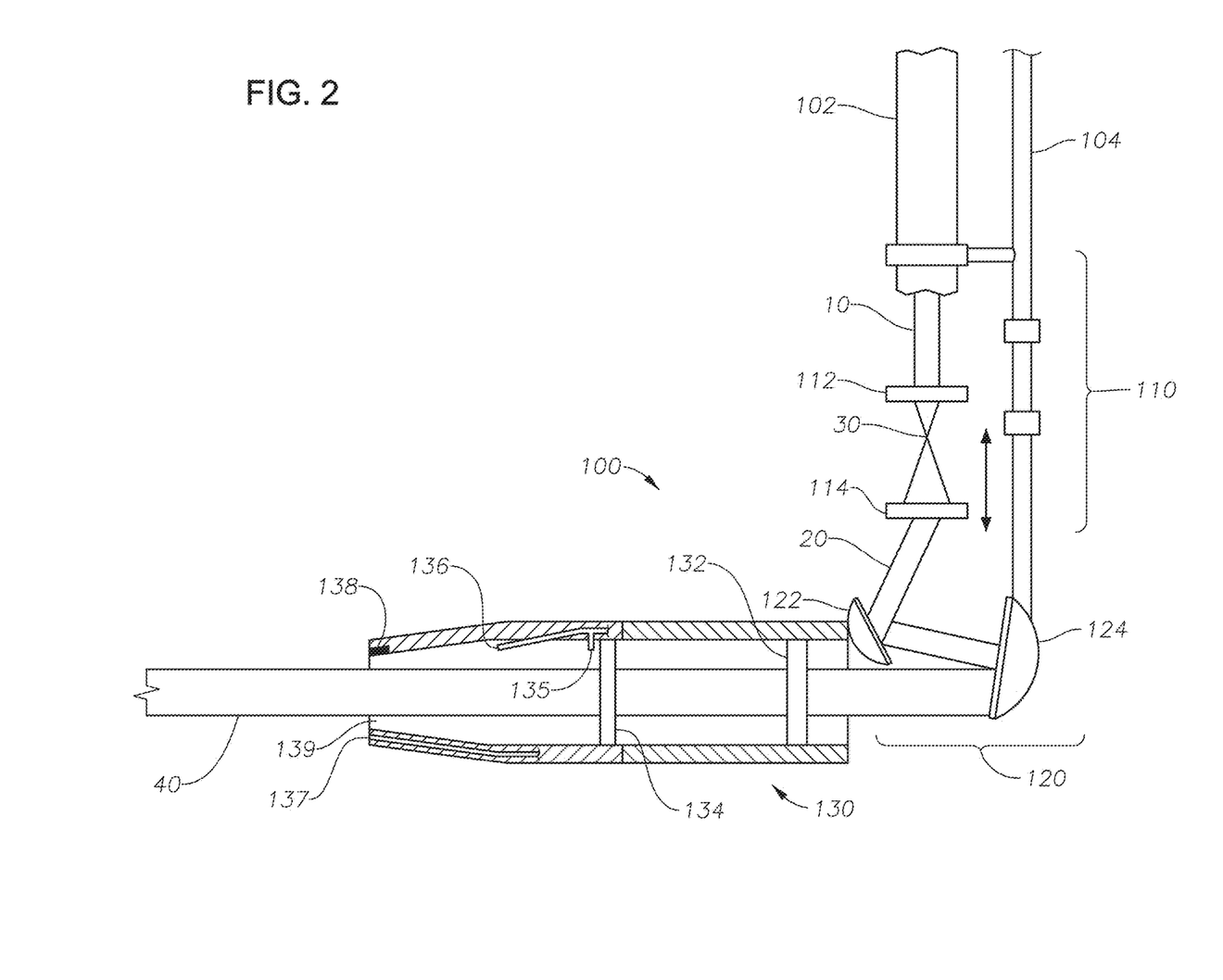
FIG. 2 is a sectional view of the laser tool.

Referring to FIG. 2, an embodiment of laser tool 100 is described. Laser tool 100 includes direction unit 110, compact scanner 120 and laser head 130.

Laser beam 10 exits fiber optic cable 102. Laser beam 10 can be from any source capable of producing a laser and directing the laser downhole.

In at least one embodiment, described with reference to FIG. 3, the source is laser unit 160 positioned on the surface of the earth near wellbore 152. Wellbore 152 has been drilled into formation 150, with cement 154 and casing 156 as reinforcement. Formation 150 can include limestone, shale, sandstone, or other rock types common in hydrocarbon bearing formations. The particular rock type of formation 150 can be determined by experiment, by geological methods, or by analyzing samples taken from formation 150. Laser unit 160 is in electrical communication with fiber optic cable 102. Laser unit 160 generates the power needed to penetrate formation 150, the power is conducted by fiber optic cable 102 to laser tool 100, where the power is released from fiber optic cable 102 to laser tool 100. Laser unit 160 can be any unit capable of producing a laser with a power between 500 watt (W) and 3000 W, alternately between 500 W and 2500 W, alternately between 500 W and 2000 W, alternately between 500 W and 1500 W, and alternately between 500 W and 1000 W. Laser unit 160 can be any type of laser unit capable of generating laser beams, which can be conducted through fiber optic cable 102. Laser unit 102 includes, for example, lasers of ytterbium, erbium, neodymium, dysprosium, praseodymium, and thulium ions. In accordance with an embodiment, laser unit 160 includes, for example, a 5.34-kW Ytterbium-doped multiclad fiber laser. In an alternate embodiment, laser unit 160 is any type of fiber laser capable of delivering a laser at a minimum loss. The wavelength of laser unit 160 can be determined by one of skill in the art as necessary to penetrate formation 150. Laser unit 160 can be part of a coiled tubing unit. Controlled beam 40 exits the laser tool and penetrates casing 156 and cement 154 before penetrating formation 150 to produce openings.

Fiber optic cable 102 can include a hard outer case surrounding an insulation cable with a protective fiber cable between the hard outer case and the insulation cable. Fiber optic cable 102 conducts laser beam 10. The hard case can be of any material which is resistant to the high temperatures, high pressures, and vibrations experienced within wellbore 152. The insulation cable can be any type of material that protects fiber optic cable 102 from overheating due to the temperature of wellbore 152 and the temperature of laser beam 10, as laser beam 10 travels from laser unit 160 to laser tool 100. The protective fiber cable can be any type of material that protects fiber optic cable from being scratched, bending, breaking, or other physical damages which could be experienced in wellbore 152. The protective fiber cable can include, for example, reinforced flexible metals, such that the reinforced flexible metals bend as fiber optic cable 102 bends or twists. The protective fiber cable can be embedded within the insulation cable or can be attached to the inner surface of the insulation cable.

Returning to FIG. 2, laser beam 10 is introduced to direction unit 110. Direction unit 110 can be connected to the end of fiber optic cable 102 such that as laser beam 10 exits fiber optic cable 102 into direction unit 110. Direction unit 110 manipulates the spot size of laser beam 10 to produce directed beam 20. The spot size of laser beam 10 can be determined based on the application and the size of the opening desired. The smaller the spot size of laser beam 10 the larger the surface area that can be encompassed by the movement pattern; the larger the spot size of laser beam 10 the smaller the surface area for the movement pattern. Direction unit 110 can include one or more optical lenses. The physical position of the lenses can impact the spot size of the laser beam. Direction unit 110 can include a focusing lens, defocusing lens, a collimating lens, both a focusing lens and a collimating lens, or both a defocusing lens and a collimating lens. In at least one embodiment, direction unit 110 includes both focused lens 112 and collimating lens 114. Focused lens 112 can be any type of optical lens that can focus laser beam 10. Focused lens 112 can be of any material capable of producing a focusing lens. Examples of materials suitable for use as focused lens 112 include glass, plastic, quartz, and crystal. Laser beam 10 can be focused in focusing lens 112 to generate focused beam 30.

Focused beam 30 is collimated in collimating lens 114 to generate directed beam 20. Collimating lens 114 can be located proximate to focusing lens 112. Collimating lens 114 can be any type of optical lens that can align light waves such that laser beam 10 has a fixed and uniform diameter. Collimating lens 114 can be of any material capable of producing a collimating lens. Examples of materials suitable for use as collimating lens 114 include glass, plastic, quartz, and crystal. Directed beam 20 is directed into compact scanner 120.

Compact scanner 120 guides directed beam 20 to generate controlled beam 40. Compact scanner 120 includes motorized master 122 and motorized slave 124. Motorized master 122 includes a master mirror mounted on a master motor. The master motor can be any type of motor cable of spinning the master mirror and adjusting the angle of the master mirror simultaneously. The master mirror can be any type of mirror capable of handling the intensity of the laser. In at least one embodiment, the master mirror can include a cooling system. Motorized master 122 can rotate the master mirror through 360 degrees of rotation. Motorized slave 124 includes a slave mirror mounted on a slave motor. The slave motor can be any type of motor cable of spinning the slave mirror and adjusting the angle of the slave mirror simultaneously. The slave mirror can be any type of mirror capable of handling the intensity of the laser. In at least one embodiment, the slave mirror can include a cooling system. In at least one embodiment the master mirror and the slave mirror are the same size. Motorized slave 124 can rotate the slave mirror through 360 degrees of rotation. Directed beam 20 strikes motorized master 122 and is reflected from motorized master 122 onto motorized slave 124. The movement of motorized slave 124 translates into the movement pattern of controlled beam 40. The movement pattern is determined based on the ratio of the rate at which motorized master 122 rotates and the angle of rotation of motorized master 122 to the rate at which motorized slave 124 rotates and the angle of rotation of motorized slave 124. The ability to rotate generates controlled beam 40 with a uniform beam distribution and energy that can be applied to the opening. By adjusting the angle of rotation between motorized master 122 and motorized slave 124 the size of the opening can be adjusted. Advantageously, having two mirrors in a master slave relationship expands the number of and shape of the movement patterns that can be obtained as compared to the use of one mirror which is restricted to few motions. The speed at which motorized master 122 and motorized slave 124 rotate determine how fast the opening is drilled.

Controlled beam 40 is reflected by motorized slave 124 into laser head 130. Laser head 130 protects compact scanner 120 from debris in formation 150. Laser head 130 includes outlet 139 through which controlled beam 40 is discharged. Laser head 130 can taper such that the diameter of outlet 139 is smaller than the diameter of the main body of laser head 130. The ratio of diameters can be determined by one of skill in the art. Outlet 139 need only be large enough to provide an unobstructed path for the discharge of controlled beam 40. The tapering of laser head 130 can prevent debris from entering laser head 130 through outlet 139. Laser head 130 remains stationary during operation of laser tool 100.

Laser head 130 can be any material which is resistant to the high temperatures, high pressures, and vibrations experienced within wellbore 152.

Laser head 130 includes inlet lens 132, outlet lens 134, air knife 135, purging nozzle 136, vacuum nozzle 137, and temperature sensor 138. Controlled beam 40 passes through inlet lens 132 and outlet lens 134. In at least one embodiment, laser head 130 can include more than two lenses. Inlet lens 132 and outlet lens 134 protect compact scanner 120 by preventing debris from entering compact scanner 120. Inlet lens 132 and outlet lens 134 do not manipulate controlled beam 40. Air knife 135 sweeps debris from outlet lens 134. Air knife 135 is proximate to outlet lens 134. Sweeping outlet lens 134 provides controlled beam 40 an unobstructed path from compact scanner 120 through laser head 130. Air knife 135 emits any gas, including, for example, air or nitrogen capable of keeping outlet lens 134 clear of debris. Inlet lens 132 and outlet lens 134 can be any material, for example, glass, plastic, quartz, crystal or other material capable of protecting compact scanner 120 without manipulating controlled beam 40. The shape and curvature of inlet lens 132 and outlet lens 134 can be determined by one of skill in the art based on the application of laser tool 100.

Purging nozzle 136 clears the path of controlled beam 40 from outlet lens 134 to formation 150. Those of skill in the art will appreciate that in certain embodiments it is the combined function of air knife 135 and purging nozzle 136 that create an unobstructed path for controlled beam 40 from inlet lens 132 to formation 150. Purging nozzle 136 can include one, two or more nozzles capable of purging the area in front of the outlet of laser head 130. Purging nozzle 136 emits any purging fluid capable of clearing debris from the outlet of laser head 130. Purging media can include, for example, liquid or gas. The choice of purging media, between liquid or gas, can be based on the rock type of formation 150 and the reservoir pressure. Purging media that allow controlled beam 40 to reach formation 150 with minimal or no loss can also be considered. According to one embodiment of the present invention, purging media would be a non-reactive, non-damaging gas such as nitrogen. A gas purging media can be used when there is a low reservoir pressure. Purging nozzle 136 lies flush inside laser head 130 between air knife 135 and the outlet of laser head 130 so as not to obstruct the path of controlled beam 40.

In accordance with an embodiment of the present invention, purging nozzle 136 operates in cycles of on periods and off periods. An on period occurs while controlled beam 40 is discharging as controlled by an on period of laser unit 160, as described above with reference to FIG. 2. In an alternate embodiment of the present invention, purging nozzle 136 operates in a continuous mode.

Vacuum nozzles 137 vacuum debris created by the sublimation of formation 150 by controlled beam 40, from the area surrounding laser head 130. The debris are removed to the surface and analyzed. Analysis of the debris can include determination of, for example, rock type of formation 150 and fluid type contained within formation 150. In an alternate embodiment of the present invention, the debris can be disposed once at the surface. Vacuum nozzles 137 can be positioned flush with laser head 130. One of skill in the art will appreciate that vacuum nozzles 137 can include one, two, three, four, or more nozzles depending on the quantity of debris. The size of vacuum nozzles 137 depends on the volume of debris to be removed and the physical requirements of the system to transport from laser tool 100 to the surface.

In accordance with one embodiment of the present invention, vacuum nozzles 137 operate in cycles of on periods and off periods. On periods occur when controlled beam 40 and purging nozzles 136 are not operating, as controlled by laser unit 160. The off periods of controlled beam 40 and purging nozzles 136 allow the vacuum nozzles 137 to clear a path, so controlled beam 40 has an unobstructed path from inlet lens 132 to formation 150. In an alternate embodiment of the present invention, vacuum nozzles 137 operate in a continuous mode. In another alternate embodiment of the present invention, vacuum nozzles 137 do not operate when purging nozzles 136 emit a liquid purging media.

Air knife 135, purging nozzles 136, and vacuum nozzles 137 can operate in conjunction to eliminate debris in the path of controlled beam 40 clear from inlet lens 132 to the penetration point in formation 150. Eliminating debris in the path of controlled beam 40 is advantageous to prevent the potential to disrupt, bend, or scatter controlled beam 40.

Laser head 130 can contain at least one temperature sensor 138, alternately at least two temperature sensors 138, alternately more than two temperatures sensors 138. Temperature sensor 138 provides temperature data to laser unit 160, as a way to monitor one physical property at laser head 130. In at least one embodiment, laser tool 100 can be configured to shut off the laser when the temperature as monitored by temperature sensor 138 exceeds a pre-set point. [Please confirm] The pre-set point can be set to avoid the overheating point of laser tool 100. The overheating point can be based on the type of laser and the configuration of laser tool 100, in addition to other parameters that may be critical to determine the overheating point. Avoiding overheating prevents damage to laser tool 100.

In general, the construction materials of laser tool 100 can be of any type of material that are resistant to the high temperatures, pressures, and vibrations experienced within existing wellbore 152 and that protect the system from fluids, dust, and debris. One of ordinary skill in the art will be familiar with suitable materials.

In at least one embodiment, laser tool 100 can be enclosed in a protective case such that only a portion of laser head 130 extends into wellbore 152. Alternately, laser tool 100 can be enclosed in the protective case and controlled beam 40 can cut through the protective case prior to contacting the formation. The protective case can be any type of material that is resistant to the high temperatures, pressures, and vibrations experienced within wellbore 152, but allows for penetration by controlled beam 40. Laser tool 100 can include additional structure such as flexible connections between fiber optic cable 102 and laser tool 100, rotational system to rotate laser tool 100 around the axis extending from the surface through wellbore 152, cabling to provide power to laser tool 100, cabling that allows for laser tool 100 to be positioned in wellbore 152, and stabilizing pads between laser tool 100 and wellbore 152. In at least one embodiment, support rod 104 can be provide stability and support to direction unit 110 and compact scanner 120.

Figure 3:
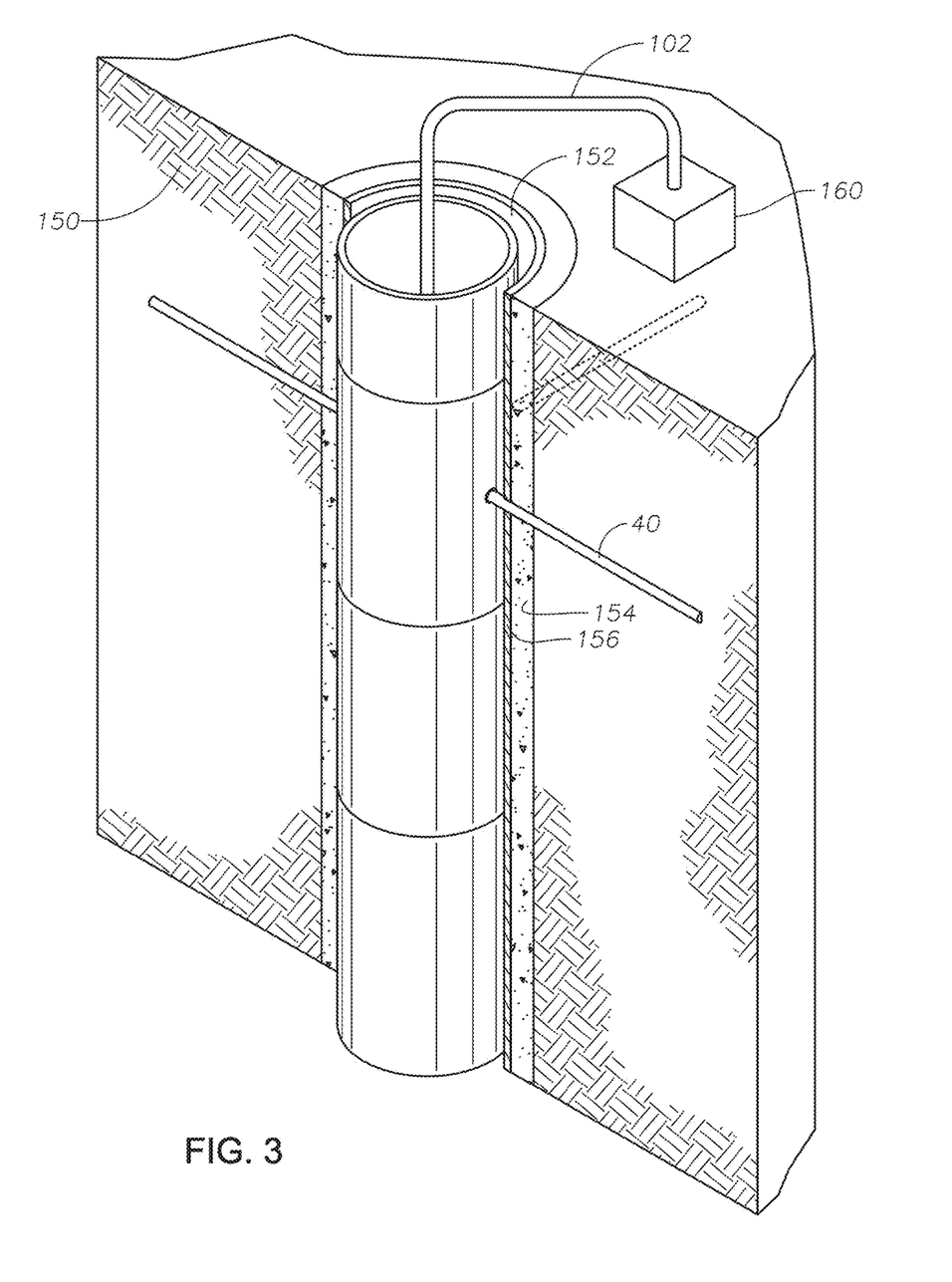
FIG. 3 is a perspective view of an embodiment of the laser tool.

Referring to FIG. 3, with reference to FIG. 2, a method of using laser tool 100 is described. In a method of using laser tool 100, the movement pattern can be programmed into compact scanner 120 at the surface prior to laser tool 100 being deployed downhole in wellbore 152. In at least one embodiment, the movement pattern can be controlled after laser tool 100 has deployed downhole in wellbore 152 through the use of a computer program. In at least one embodiment, compact scanner 120 can be programmed by setting the angle of master mirror and the slave mirror, which then determines the ratio to dictate the movement pattern. Laser tool 100 can be deployed into wellbore 152 to the position desired. Laser tool 100 can be operated to generate controlled beam 40. In at least one embodiment, controlled beam 40 contacts casing 156 and perforates casing 156. The time period to perforate casing 156 can depend on the thickness of casing 156 and the movement pattern of controlled beam 40. In at least one embodiment, controlled beam 40 contacts cement 154 and perforates cement 154. The time period to perforate casing 156 can depend on the thickness of casing 156. In at least one embodiment, controlled beam 40 can contact any number of layers or sheaths defining the wellbore relative to the formation and perforate those layers prior to contact with formation 150.

Controlled beam 40 contacts formation 150 in the movement pattern. As controlled beam 40 contacts formation 150 the rock material of formation 150 is sublimated in the movement pattern. The shape of the opening can be imposed by the movement pattern. The penetration depth can be dictated by the run length of controlled beam 40, the movement pattern, and the properties of formation 150, such as rock maximum horizontal stress, or the compressive strength of the rock. In at least one embodiment, the penetration depth can be greater than six inches, alternately greater than one foot, alternately greater than two feet, alternately greater than three feet.

The openings produced by controlled beam 40 establish communication between formation 150 and wellbore 152. The openings produced by controlled beam 40 can allow for production for hydrocarbons from formation 150 to wellbore 152 through the openings.

Advantageously, laser tool 100 enables production from tight and unconventional reservoirs. The use of laser tool 100 to create an opening in formation 150 can take more time that direct drilling, but direct drilling cannot produce openings that have shapes other than circular. Direct drilling as used here refers to the use of a high power laser to cut a formation, where the high power laser cannot move along both the x axis and the y axis of the plane parallel to the face of formation 150.

Laser tool 100 can be produced from materials and include protective shields or housings to protect from vibrations, temperatures and pressures in the downhole environment.

EXAMPLES

Figure 4A:
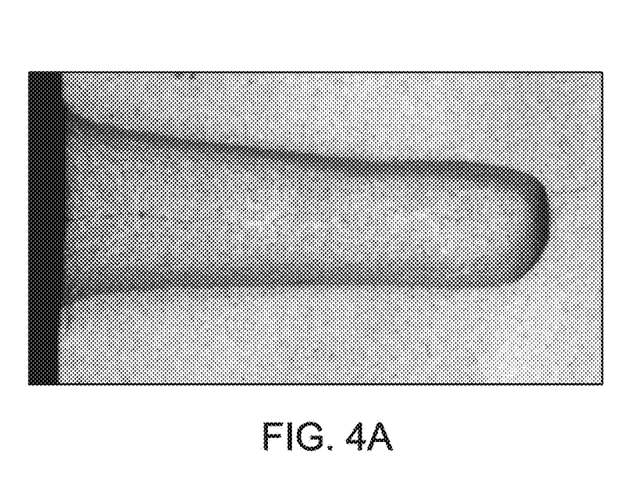
FIG. 4A is a pictorial representation of shapes of an opening.
Figure 4B:
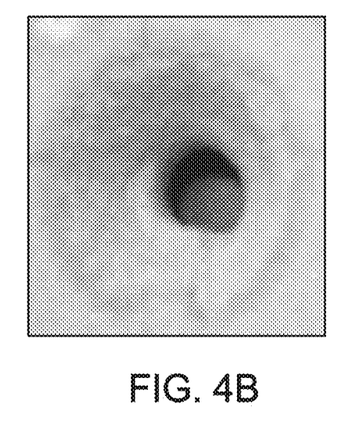
FIG. 4B is a pictorial representation of a shape of an opening.
Figure 4C:
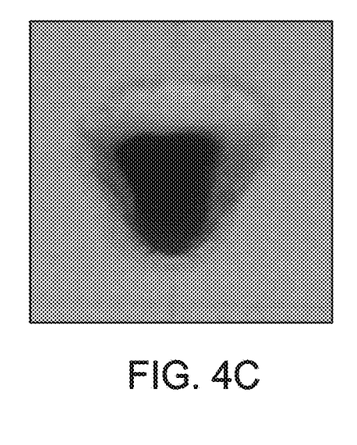
FIG. 4C is a pictorial representation of a shape of an opening.

A berea sandstone sample was obtained. A 2 kW power laser unit was used. In a first run and second run, the ratio of the master mirror to the slave mirror was set at 1:1.1. The run time was 32 seconds. The first run resulted in the shape shown in FIG. 4A. The second run resulted in the shape shown in FIG. 4B. In a third run, the ratio of the master mirror to the slave mirror was set at 1:2. The run time was 32 seconds. The third run was 32 seconds. The third run resulted in the shape shown in FIG. 4C.

Although the embodiments have been described in detail, it should be understood that various changes, substitutions, and alterations can be made hereupon without departing from the principle and scope. Accordingly, the scope of the embodiments should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

As used here and in the appended claims, the words "comprise," "has," and "include" and all grammatical variations thereof are each intended to have an open, non-limiting meaning that does not exclude additional elements or steps.

That which is claimed is:

1. A method to control the shape of an opening in a formation, the method comprising the steps of:
   emitting a laser beam from a fiber optic cable into a direction unit, wherein the direction unit comprises a focusing lens and a collimating lens;
   focusing the laser beam in the focusing lens to produce a focused laser;
   collimating the focused beam in the collimating lens to produce a directed beam;
   directing the directed beam onto a motorized master, wherein the motorized master is contained in a compact scanner, wherein the compact scanner further comprises a motorized slave, wherein the motorized master comprises a master mirror and a master motor, wherein the motorized slave comprises a slave mirror and a slave motor;
   operating the motorized master and the motorized slave to produce a controlled beam, wherein the controlled beam moves in a movement pattern;
   introducing the controlled beam to a laser head, wherein the laser head comprises an inlet lens, an outlet lens, an air knife, a purging nozzle, a vacuum nozzle, and a temperature sensor;
   passing the controlled beam through the inlet lens and the outlet lens, wherein the inlet lens and outlet lens protect the compact scanner from debris;
   sweeping the outlet lens with gas from the air knife;
   purging the path of the controlled beam with a purging fluid from the purging nozzle;
   sublimating the formation to produce the opening, wherein in the shape of the opening is dictated by the movement pattern of the controlled beam; and
   vacuuming the dust and vapor with the vacuum nozzle.

2. The method of claim 1, further comprising the steps of:
   extending a laser tool into a wellbore extending through the formation, the downhole laser tool comprising the direction unit, the compact scanner, and the laser head;
   operating a laser unit to produce the laser beam; and
   directing the laser beam through the fiber optic cable from the laser unit to the laser tool.

3. The method of claim 1, wherein the movement pattern is determined based on a ratio of a rotation of motorized master to a rotation of the motorized slave.

4. The method of claim 2, further comprising the step of programming the compact scanner to achieve the movement pattern prior to the step of extending the laser tool into the wellbore.

5. The method of claim 1 further comprising the step of penetrating a casing and cement surrounding the wellbore prior to the step of sublimating the formation.

6. The method of claim 1, wherein the shape of the opening is an oval.

7. The method of claim 1, wherein a power of the laser beam is between 500 W and 2500 W.

8. An apparatus to control the shape of an opening in a formation, the apparatus comprising:
   a direction unit, the direction unit is configured to manipulate a size of a laser beam to produce a directed beam, wherein the direction unit comprises a focusing lens and a collimating lens;
   a compact scanner optically connected to the direction unit, the compact scanner configured to guide the directed beam to produce a controlled beam, wherein the compact scanner comprises a motorized master and a motorized slave, wherein the controlled beam has a movement pattern; and a laser head optically connected to the compact scanner, the laser head configured to protect the compact scanner from debris, wherein the laser head comprises an inlet lens, an outlet lens, an air knife, a purging nozzle, a vacuum nozzle, and a temperature sensor.

9. The apparatus of claim 8, further comprising:

a laser unit configured to generate the laser beam; and a fiber optic cable optically connected to the laser unit, the fiber optic cable configured to transmit the laser beam from the laser unit to the direction unit, wherein the laser unit is located near a wellbore extending into a formation, wherein the fiber optic extends through the wellbore, wherein the direction unit, the compact scanner and the laser unit are positioned in the wellbore.

10. The apparatus of claim 8, wherein the focusing lens is configured to focus the laser beam to produce a focused beam, further wherein the collimating lens is configured to collimate the focused beam to produce the directed beam.

11. The apparatus of claim 8, wherein the motorized master comprises a master motor and a master mirror.

12. The apparatus of claim 8, wherein the motorized slave comprises a slave motor and a slave mirror.

13. The apparatus of claim 8, wherein the movement pattern is determined by a ratio of a rotation of the motorized master to a rotation of the motorized slave.

14. The apparatus of claim 8, wherein the shape of the opening is dictated by the movement pattern of the controlled beam.

15. The apparatus of claim 8, wherein the shape of the opening is an oval.

\* \* \* \* \*